United States Patent [19]

Forsman

[11] 4,217,999
[45] Aug. 19, 1980

[54] SKICASE

[75] Inventor: Hans E. Forsman, Strängnäs, Sweden

[73] Assignee: Forsman Armerad Plast AB, Strängnäs, Sweden

[21] Appl. No.: 878,327

[22] Filed: Feb. 16, 1978

[51] Int. Cl.² .............................................. B60R 9/12
[52] U.S. Cl. ............................... 224/319; 211/60 SK; 220/4 B; 224/328
[58] Field of Search ...................... 224/42.1 E, 42.1 F, 224/42.1 R, 29 R, 42.45 R, 42.42 R; 280/11.37 K, 11.37 A; 211/60 SK; 220/4 R, 4 E, 4 B

[56] References Cited

U.S. PATENT DOCUMENTS

| 3,209,971 | 10/1965 | Goodell | 224/42.1 E |
| 3,837,548 | 9/1974 | Nerger | 224/45 S |
| 3,889,861 | 6/1975 | Fihn | 224/45 S |
| 3,915,362 | 10/1975 | Hart | 224/42.1 E |
| 4,084,735 | 4/1978 | Kappas | 224/42.1 E |

FOREIGN PATENT DOCUMENTS 2239120  2/1974  Fed. Rep. of Germany ...... 224/42.1 E Primary Examiner—Jerold M. Forsberg
Attorney, Agent, or Firm—Laff, Whitesel & Rockman

[57] ABSTRACT

This invention relates to a skicase for transportation on the top or roof carrier of an automobile and comprises two separate parts, a top part and a bottom part, both with side walls and end walls. The top part surrounds with a rim overlapping and tightly fitted against the upper edge of the walls of the bottom part and has a front end with a nose for selflockingly engagement with the corresponding end of the bottom part, whereas the back end is provided with a lock for securing the two parts to each other. There is alos provided fastening means for securing the bottom part to the top carrier.

4 Claims, 14 Drawing Figures

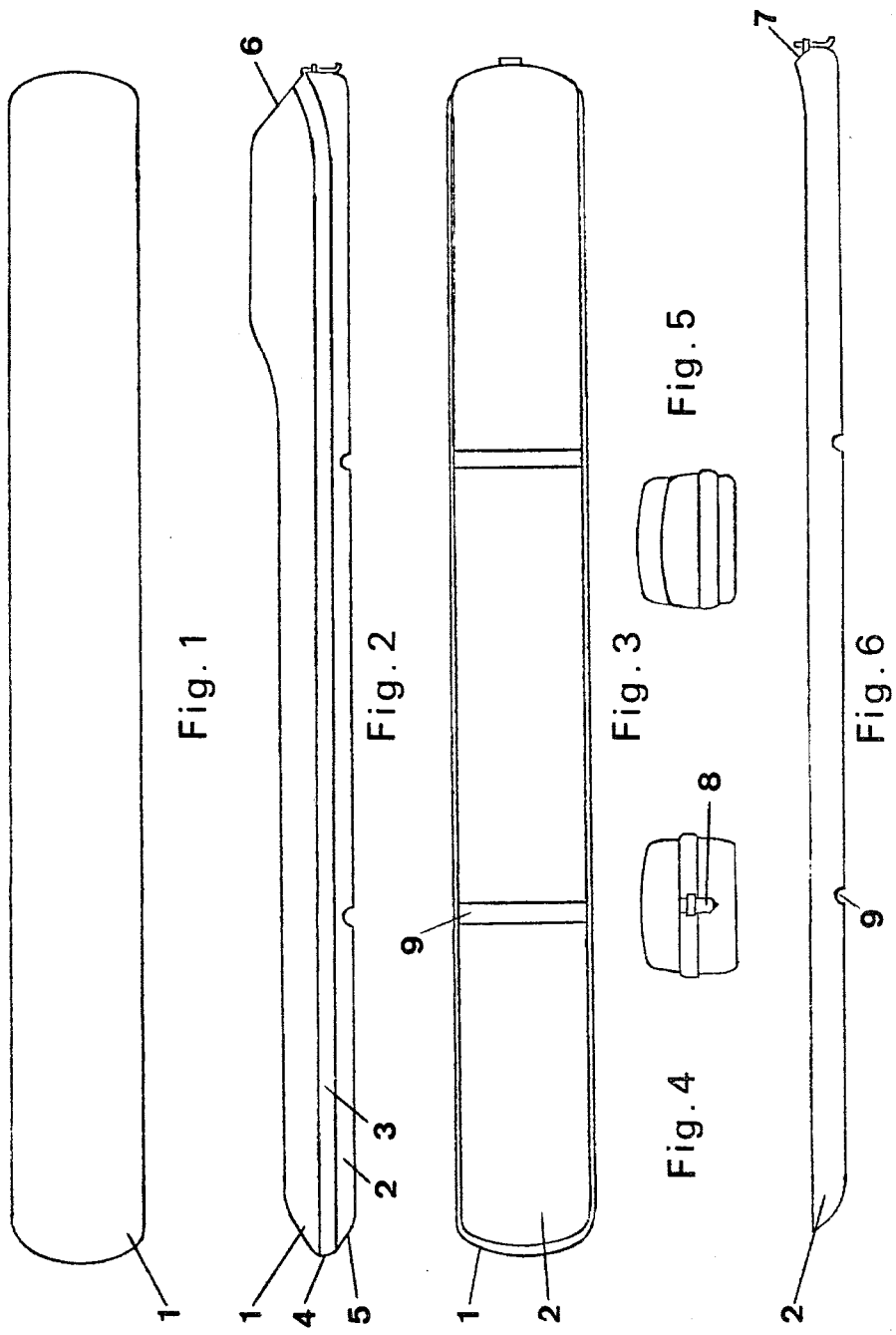

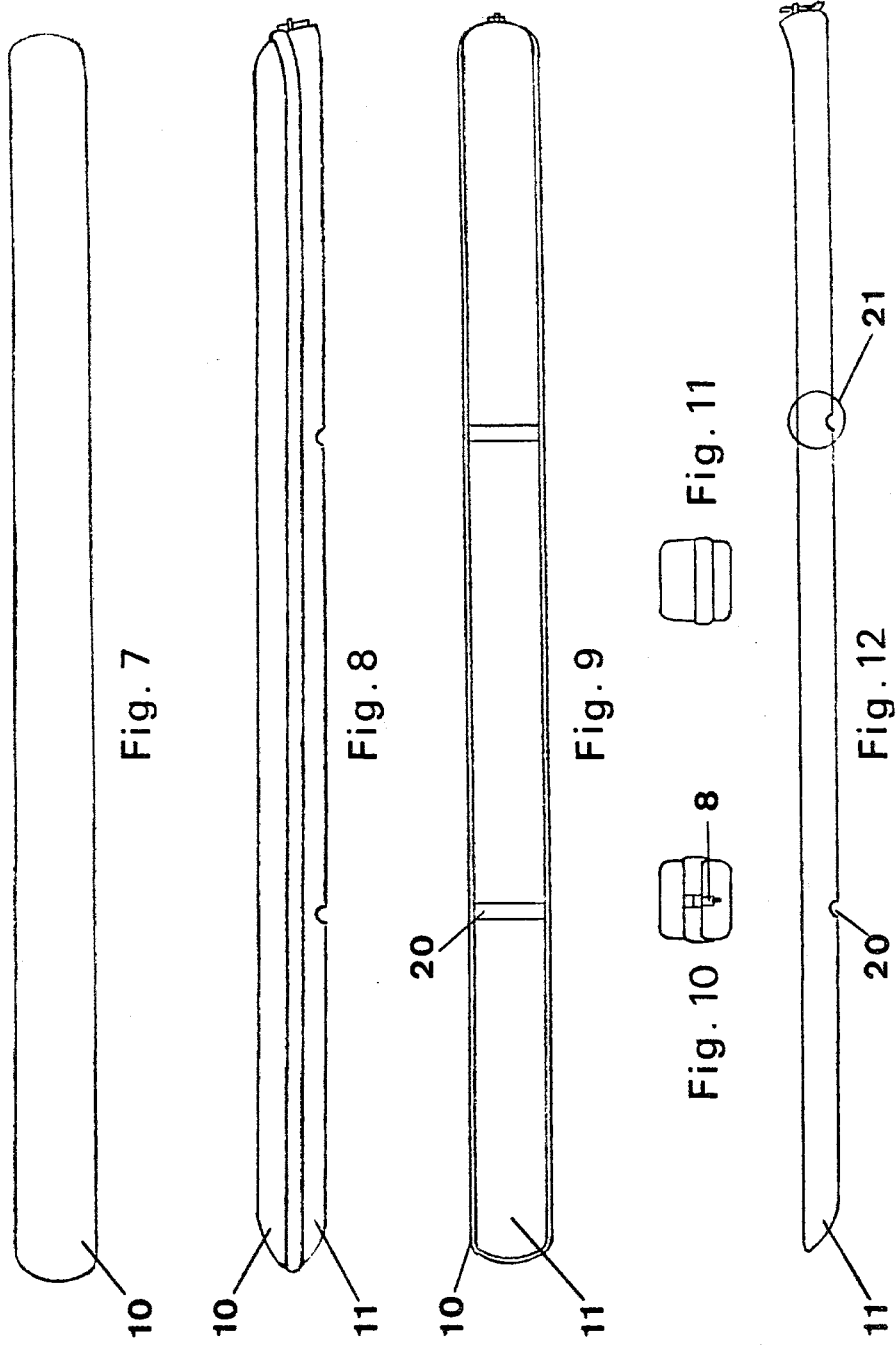

SKICASE

This invention relates to a skicase for transportation on the top or roof carrier of an automobile.

The conventional method of transporting ski equipment on the top or roof carrier of an automobile is to insert the equipment into a fabric bag which is tied to the top carrier. However this is by no means a safe method. First of all, the ski equipment is not adequately protected. This transportation can also mean a traffic risk, if the bag form of ski should come loose and fall from the automobile and onto the road.

It is an object of the present invention to provide a skicase which prevents the ski equipment, when the skicase is placed on or transported on a top carrier of an automobile, from being damaged or stolen and enables the skicase to be safely secured to the top carrier.

The novel features which are believed to be characteristic of this invention are set forth with particularlity in the appended claims. The invention itself, however, both as to its organization and method of operation, together with further objects and advantages thereof, may best be understood by reference to the following description taken in connection with the accompanying drawings, in which:

FIG. 1 is a top plan view of a skicase according to a first design,

FIG. 2 is a side view of the same skicase,

FIG. 3 is a bottom plan view of the same skicase,

FIG. 4 is a right end view of the same skicase,

FIG. 5 is a left end view of the same skicase,

FIG. 6 is a side view of a bottom part included in the same skicase,

FIG. 7 is a top plan view of a skicase according to a second design,

FIG. 8 is a side view of this second skicase,

FIG. 9 is a bottom plan view of this second skicase,

FIG. 10 is a right end view of this second skicase,

FIG. 11 is a left end view of this second skicase,

FIG. 12 is a side view of a bottom part included in this second skicase,

Figure 14:
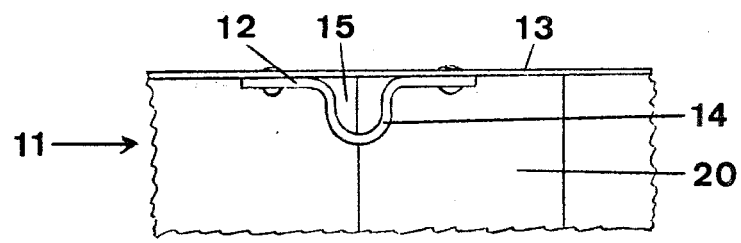
FIG. 14 is a top view of the bottom part according to FIG. 13, but excluding the fastening means.

The first design of the skicase is disclosed in FIG. 1-6. The skicase comprises two main parts separated from each other and made of a fiber-glass reinforced plastic material. The one of this main parts is a top part 1 and the other one is a bottom part 2, both having side walls and end walls. The top part 1 is provided with a lower rim 3, tightly overlapping and surrounding the upper edge of the bottom part 2. The left end (front end) wall of the top part 1 forms a nose 4, whose lower rim has an acute angle to the top plane, whereas the engaging end wall 5 of the bottom part 2 forms a corresponding obtuse angle to the bottom plane. The right end (back end) wall 6 of the top part 1 forms an obtuse angle to the top plane, whereas the engaging end wall 7 forms a corresponding acute angle to the bottom plane.

The right end of the skicase is provided with an eccentric lock 8, which can have an eye for insertion of a padlock. When the top part 1 is placed on the bottom part 2 and the two parts are connected at their right ends by the lock 8, the left end of the skicase is self-locked by means of the nose 4 of the top part fitting over, engaging nesting in, and containing the sloping wall 5 of the bottom part.

The bottom part 2 is, on its underside, provided with a plurality of horizontal, transverse channels 9, in this example two in number, for cooperation with horizontally extending, transverse members included in the top carrier of the automobile.

The skicase according to FIG. 7-12 is of a somewhat narrower design, especially intended to be used for transportation both by automobile and by air. The parts 10 and 11 correspond, on the whole, with the parts 1 and 2 in the first design, and require no further description. In this second skicase the skis are placed on edge, one with its tip turned forwards and one with its tip turned backwards, and both tips being turned inwards. The ski sticks are placed between the skis with their disks on opposite ends of the ski case.

Figure 13:
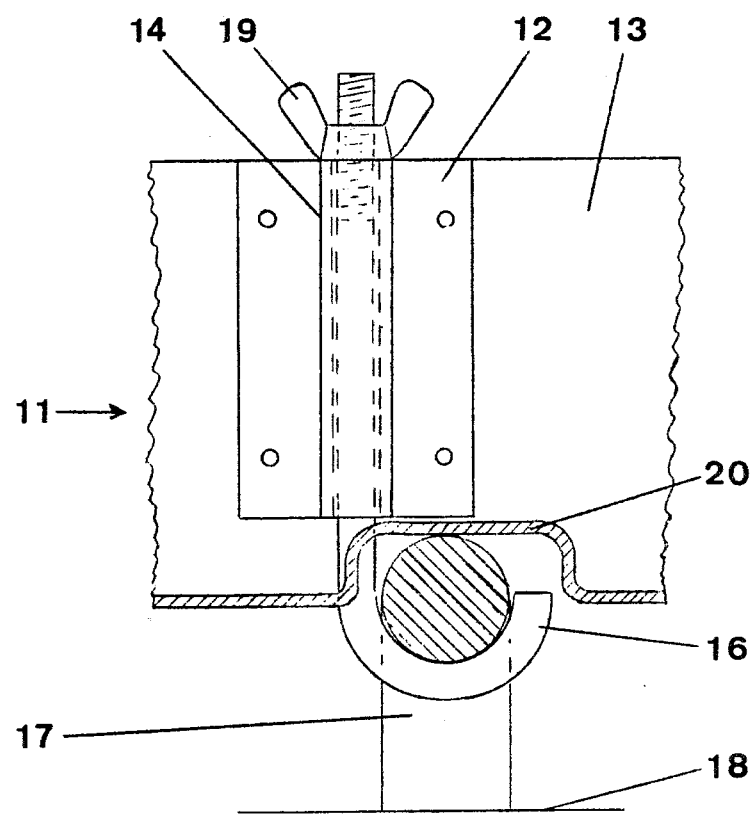
FIG. 13 is a sectional side view seen towards the innerside of the side wall of the bottom part in the area indicated by the circle 21 in FIG. 12, and completed with fastening means for securing the bottom part to a top carrier of an automobile.

With reference to FIG. 13 and 14, a plate 12 is riveted to the inside of the bottom side wall 13. This plate 12 is placed above the bottom channels 20 of the part 11. Plate 12 extends from the upper edge of the side wall 13 and has a groove 14 forming a channel 15 for receiving a vertically extending hook member 16 engaging a transverse horizontal rod 17 included in the carrier secured to the automobile top 18. In this example, at least two such horizontal rods are required.

The bottom part 11 of the skicase is placed in relation to the top carrier so that the two channels 20, in the bottom of part 11, are positioned over two of the rods 17. Thus, in this example four plates 12 and four hook members 16 are required, for each end of each channel 20.

The upper end of each hook member 16 is threaded for engagement with a threaded wing nut 19, which is screwed so far onto the hook member that the bottom part 11 is safely secured to the top carrier. The wing nuts 19 remain above the upper edges of the two side walls 13 of the bottom part 11, but vertically inside the outer surfaces of the side walls, provided that the wing nuts 19 are directed with the longitudinal axis of their wings setting in the length direction of the skicase.

When the top part 10 is placed onto the bottom part 11 and secured thereto by the lock 8 the side walls of the top part 10 will prevent the wings nuts 19 from turning, which otherwise easily could happen responsive to automobile vibrations. This eliminates the risks that the skicase will get loose and falls onto the road.

When the skicase is locked by the eccentric lock 8 and the padlock, it is impossible to remove the case from the top carrier. The ski equpment is safely kept in the case, both with regard to damage and theft. The skicase cannot get loose during its transportation on the top carrier.

We claim:

1. A skicase for transportation on a top carrier of an automobile comprising two completely separate main parts comprising a top part and a bottom part which may be removed therefrom, both of said parts having side and end walls, said top part having an outer border of its walls shaped for overlapping and tightly surrounding an upper border of the walls of said bottom part, the one end wall of said top part being formed with an internally concave nose which fits over and nests with a corresponding convex end on the bottom part for self-locking engagement with said corresponding end wall of said bottom part, locking means for connecting said two main parts with each other at the end which is opposite to said nesting end, and fastening means to secure said bottom part to a top carrier of an automobile, said fastening means comprising a plurality of hook members for engaging a top carrier, each hook member having a bolt-like stem extending vertically through said bottom part at a point which is close to the inside of its side walls, said stem having a threaded upper end extending above said side wall and a wing nut on said threaded stem, said hook member securing said bottom part to said top carrier, said wing nut being non-accessible from the outside of said skicase when the top part is placed and locked to the bottom part, and said side walls of said top part interfering with and preventing said wing nut from unscrewing itself responsive to automobile vibration.

2. A skicase according to claim 1 wherein said two main parts are made of a fiber-glass reinforced plastic material.

3. A skicase according to claim 1 wherein the underside of the bottom part has at least two horizontal and transverse channels for cooperation with horizontally extending transverse members included in a top carrier.

4. A skicase according to claim 1 wherein said locking means comprises a hasp lock with a padlock.

* * * * *